US011744420B2

(12) United States Patent
Kranich et al.

(10) Patent No.: US 11,744,420 B2
(45) Date of Patent: *Sep. 5, 2023

(54) VACUUM COLLECTION VEHICLE

(71) Applicant: RCMK Industries, LLC, Waterford, WI (US)

(72) Inventors: Matthew J. Kranich, Waterford, WI (US); Robert G. Chumbley, Racine, WI (US)

(73) Assignee: RCMK Industries, LLC, Waterford, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,836

(22) Filed: Dec. 2, 2022

(65) Prior Publication Data

US 2023/0096342 A1    Mar. 30, 2023

Related U.S. Application Data

(63) Continuation of application No. 17/060,021, filed on Sep. 30, 2020, now Pat. No. 11,540,687.

(51) Int. Cl.
*A47L 9/14* (2006.01)
*A47L 9/00* (2006.01)
*A47L 9/19* (2006.01)
*A47L 9/28* (2006.01)
(Continued)

(52) U.S. Cl.
CPC ............. *A47L 9/1409* (2013.01); *A47L 9/009* (2013.01); *A47L 9/104* (2013.01); *A47L 9/149* (2013.01); *A47L 9/19* (2013.01); *A47L 9/242* (2013.01); *A47L 9/2894* (2013.01)

(58) Field of Classification Search
CPC ........ A47L 9/1409; A47L 9/009; A47L 9/104; A47L 9/19; A47L 9/242; A47L 9/2894; A47L 11/4019; A47L 7/0052; A47L 7/0057; A47L 7/0061; A47L 7/0066;
(Continued)

(56) References Cited

U.S. PATENT DOCUMENTS 4,234,980 A   11/1980   DiVito et al.
4,749,391 A    6/1988   DeMarco
(Continued)

OTHER PUBLICATIONS

Information Disclosure Statement by Applicants regarding commercial construction and commercial use of rig by Applicants greater than one year prior to Sep. 30, 2020.

*Primary Examiner* — Don M Anderson
*Assistant Examiner* — Caleb Andrew Holizna
(74) *Attorney, Agent, or Firm* — Rathe Lindenbaum LLP

(57) ABSTRACT

A vacuum collection vehicle may include a chassis, a vacuum container supported by the chassis, a vacuum source separated from the vacuum container by an intermediate wall and a filter. The vacuum source is in pneumatic connection with the filter through the intermediate wall. A plurality of discharge conduits extend through the intermediate wall, extend over and above the filter, along the roof of the vacuum container. The plurality of discharge conduits have a plurality of respective outlets at different locations within the interior of the vacuum container for discharging collected material into different collection receptacles. The filter is sandwiched between the intermediate wall and the plurality of discharge conduits.

20 Claims, 7 Drawing Sheets

Figure 1:
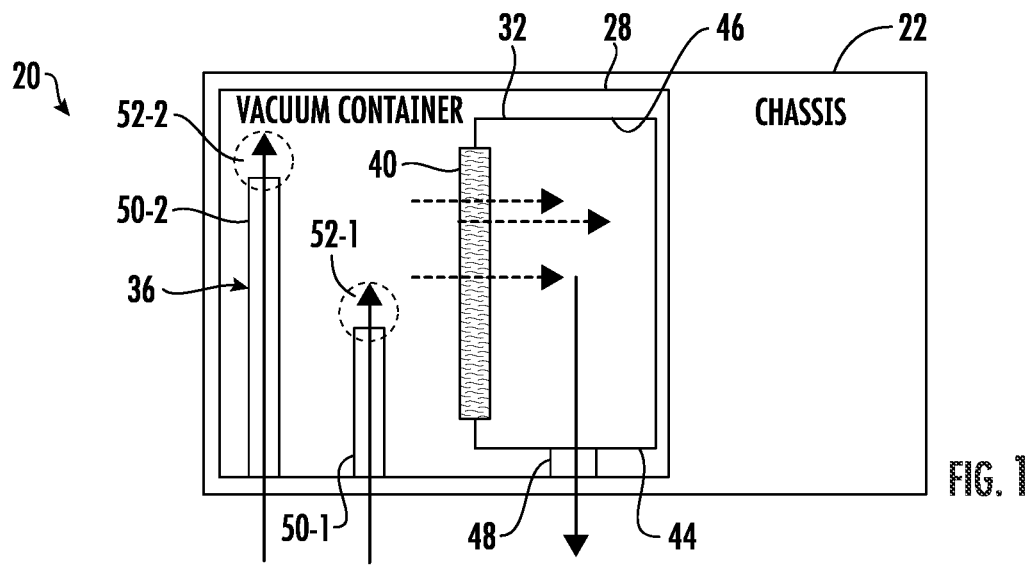

(51) Int. Cl.
*A47L 9/24* (2006.01)
*A47L 9/10* (2006.01)

(58) Field of Classification Search
CPC .......... A47L 7/0071; A47L 5/36; A47L 5/362;
E01H 1/08; E01H 1/0827; E01H 1/0836
USPC ..... 15/319, 340.1, 340.2, 340.3, 340.4, 314,
15/315, 327.7, 347
See application file for complete search history.

(56) References Cited

U.S. PATENT DOCUMENTS

| | | | |
|---|---|---|---|
| 5,996,171 A * | 12/1999 | Bowers | B01D 50/20 15/340.1 |
| 6,790,368 B1 | 9/2004 | Vachon | |
| 2008/0250586 A1 * | 10/2008 | Tagliaferri | B01D 46/62 15/352 |
| 2020/0224789 A1 | 7/2020 | Feuster | |
| 2020/0353954 A1 | 11/2020 | Veit et al. | |

\* cited by examiner

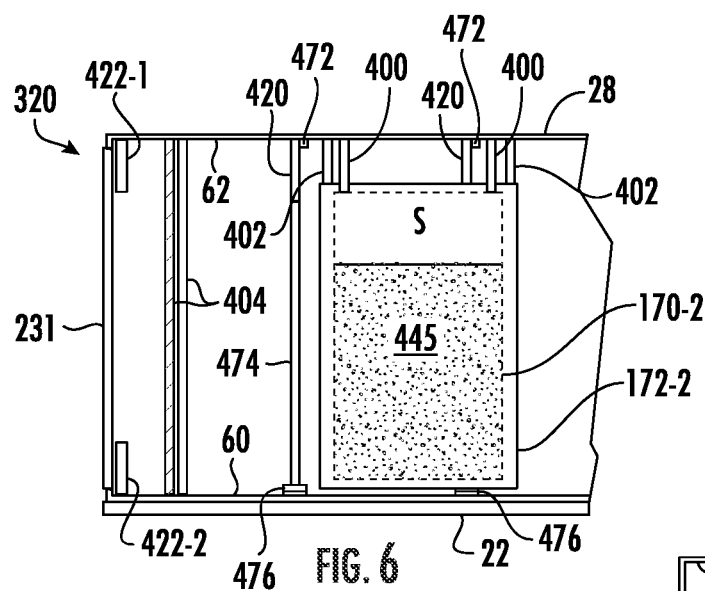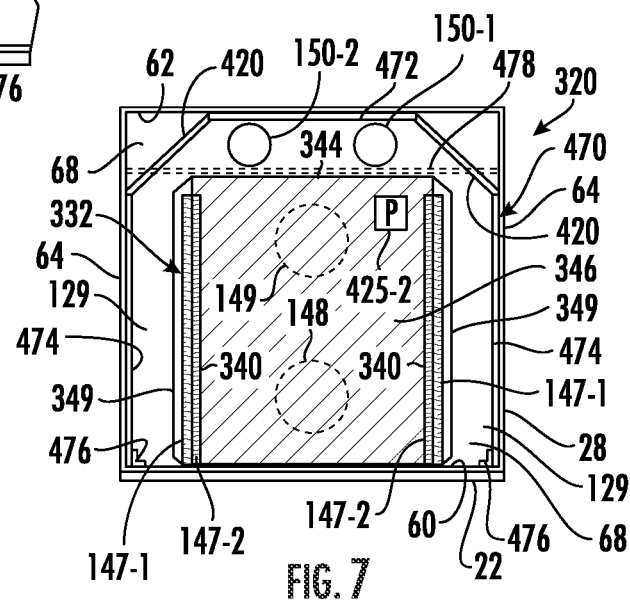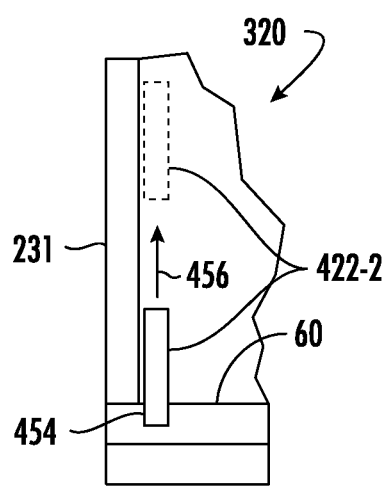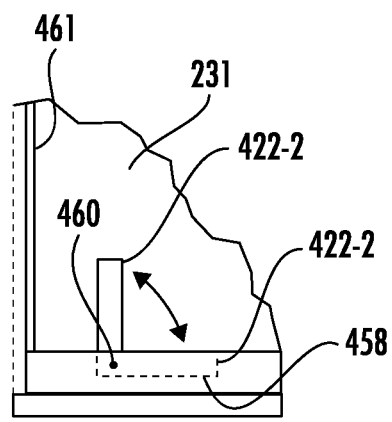

VACUUM COLLECTION VEHICLE

CROSS-REFERENCE TO RELATED APPLICATION

This continuation application claims priority under 35 USC § 120 from co-pending U.S. patent application Ser. No. 17/060,021 filed on Sep. 30, 2020 by Matthew J. Kranich and entitled VACUUM COLLECTION VEHICLE, the full disclosure of which is hereby incorporated by reference.

BACKGROUND

Older buildings and other sites may sometimes contain hazardous materials such as asbestos or vermiculite contaminated with asbestos. Removing and collecting such hazardous materials is often tedious, challenging, and expensive.

BRIEF DESCRIPTION OF THE DRAWINGS

FIG. 1 is a top view schematically illustrated portions of an example vacuum collection vehicle.

FIG. 2A is a side view schematically illustrated portions of an example vacuum collection vehicle.

FIG. 2B is a top view of the example vacuum collection vehicle of FIG. 2A.

FIG. 3A is a side view schematically illustrated portions of an example vacuum collection vehicle.

FIG. 3B is a top view of the example vacuum collection vehicle of FIG. 3A.

FIG. 4 is a top view schematically illustrating portions of an example vacuum collection vehicle.

FIG. 5 is a fragmentary top sectional view illustrating a portion of the example vacuum collection vehicle of FIG. 4.

FIG. 6 is a side sectional view illustrating a portion of the example vacuum collection vehicle of FIG. 4.

FIG. 7 is a sectional view of the example vacuum collection vehicle of FIG. 4 taken along line 7-7.

FIG. 8 is an enlarged fragmentary sectional view illustrating an example reinforcement post for the example vacuum collection vehicle of FIG. 4.

FIG. 9 is an enlarged fragmentary sectional view illustrating an example reinforcement post for the example vacuum collection vehicle of FIG. 4.

FIG. 10 is a fragmentary rear perspective view of an interior of an example vacuum collection vehicle, illustrating an example discharge system of the collection vehicle.

FIG. 11 is a fragmentary perspective view of a portion of an interior of a vacuum container of the example vacuum collection vehicle of FIG. 10, illustrating an example filter unit.

FIG. 12 is a fragmentary perspective view of a portion of an interior of an example storage container of the example vacuum collection vehicle of FIG. 10, illustrating an example hose reel and vacuum source within the example storage container.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example vacuum collection vehicles which facilitate the use of a vacuum to collect fibrous and particulate materials. Disclosed are example vacuum collection vehicles that may be well suited for removing and collecting hazardous materials such as asbestos, materials containing asbestos or other hazardous and nonhazardous materials that may not contain asbestos. The example vacuum collection vehicles facilitate such collection in a less complicated and lower cost manner.

The example collection vehicles provide a vacuum container supported by a chassis. The chassis may be part of a towed vehicle such as a trailer or may be part of a self-propelled vehicle, such as a truck or the like. The vacuum container may include a filter unit having a filter housing that supports a filter, wherein a vacuum is created within the vacuum container by drawing air from the interior of the vacuum container and out through the filter. The filter may capture hazardous material suspended in the air being drawn from the vacuum container to reduce the discharge of hazardous material to the outside environment. The example vacuum collection vehicle may include multiple discharge conduits connected to the interior of the vacuum collection vehicle at different locations. The material being collected may be drawn or suctioned through the different discharge conduits, using the vacuum created within the interior of the vacuum container, and deposited at the different locations correspond to the differently located outlets of the discharge conduits.

In some implementations, the filter housing that supports the filter forms a post filter interior that is to be connected to a vacuum source, is supported within the vacuum container independent of opposing interior walls. The phrase "independent of opposing interior walls" refers to the filter housing not being mounted to, fastened to, or otherwise connected to two interior walls of the vacuum container which face one another. For example, the example filter housings are not mounted to opposing side walls nor are they mounted to both the floor and the roof or ceiling of the vacuum container. In some implementations, the filter housing is mounted solely to one of the two side walls, or a front wall of the vacuum container without being connected to the other of the two side walls or the rear wall of the vacuum container. In some implementations, filter housing may be mounted solely to the ceiling or roof of the vacuum container. In some implementations, the filter housing may be mounted to two adjacent, but not opposing interior walls of the vacuum container. For example, in some implementations, filter housing may be mounted to a floor and a front wall of the vacuum container, a front wall and a roof or ceiling of the container, a side wall and floor of the vacuum container or a side wall and roof or ceiling of the vacuum container.

Because the filter housing is supported independent of opposing interior walls of the vacuum container, the seals between the filter housing and the supporting interior wall(s), which seal between the post filter interior and the main interior of the vacuum container, are subject to less torque and less stress during transport of the vehicle which may reduce the likelihood of damage or stress to the seals. By maintaining the integrity of the seals, the example vacuum collection vehicles ensure a greater portion of the air being drawn from the vacuum container, to create the vacuum within the vacuum container, passes through the filter to discharge cleaner air to the outside environment, such as to be Environmental Protection Agency (EPA) compliant.

The example vacuum collection vehicles may include a storage container supported by the same chassis that supports the vacuum container. The storage chamber is separated from the vacuum source by an intermediate wall. The multiple discharge conduits may extend along the roof of the vacuum container and extend through the intermediate wall. In some implementations, the storage chamber may contain the vacuum source that is used to create the vacuum within the vacuum container. In some implementations, the storage chamber may additionally comprise a hose reel for winding and storing collection hoses that are to be connected to the discharge conduits and that are used to draw in the material being collected using the vacuum formed in the vacuum container. With such example vacuum collection vehicles, separate transport of vacuum sources and/or collection hoses is eliminated, facilitating use of a single vehicle to carry out material removal and collection. In some implementations, the vacuum collection vehicles remain under 26000 pounds so as to permit operation without commercial driver's licenses, reducing cost.

The example vacuum collection vehicles may include collection receptacles located at the different locations within the vacuum container. Such collection receptacles facilitate withdrawal and disposal of the collected material, potentially hazardous, at a landfill or other disposal site. In some implementations, the collection receptacles may include an inner air transmissive or perforated vacuum or filter bag through which air may be drawn, but wherein the material being collected is too large to pass through the perforations or fabric of the perforated vacuum or filter bag. In some implementations, the collection receptacles may include an outer non-air transmissive or imperforate bag which is to surround the perforated vacuum bag. The outer imperforate bag may form an imperforate seal or barrier about the vacuum bag, facilitating its disposal at a landfill or other disposal site.

In some implementations, the example vacuum collection vehicles may include inner collection receptacle supports and outer collection receptacle supports. The inner collection receptacle supports are each located and configured so as to be mountable to the transmissive inner collection receptacle (vacuum or filter bag) so as to support the inner collection receptacle in an upright orientation. In some implementations, the inner collection receptacle support holds open the mouth of an inner collection receptacle that is in the form of a filter bag.

The outer collection receptacle supports are located and configured so as to be mountable to the outer non-transmissive or imperforate collection receptacle while supporting the outer collection receptacle about and spaced from the inner collection receptacle. The outer collection receptacle supports support the outer collection receptacle so as to form a sufficient space between the mouth of the outer collection receptacle and the mouth of the inner collection receptacle for the passage of air through the filter bag and out through the space between the mouth of the outer collection receptacle and the mouth of the inner collection receptacle. In one example implementation, the spacing is at least 12 inches.

In some implementations, the inner collection receptacle support and the outer collection receptacle support each comprise a series of clips, clamps, hooks, hangers or the like that clamp, snap, hook or otherwise engage and releasably attach to portions of the respective inner and outer collection receptacles proximate the mouths of the inner and outer collection receptacles. In some implementations, the inner collection receptacle supports, and the outer collection receptacle supports are each suspended from the ceiling or roof of the vacuum container. In some implementations, the inner collection receptacle supports and the outer collection receptacle supports project upwardly from the floor of the vacuum container to a height for engaging those portions of the respective containers proximate the mouths of the respective containers. In some implementations, the inner collection receptacle supports, and the outer collection receptacle supports may be cantilevered or projected from the interior side walls of the vacuum container at a height for engaging portions of the respective containers proximate the mouths of the respective containers.

In some implementations, the example vacuum collection vehicles have a sufficiently low weight to reduce fuel or energy consumption during travel and to reduce operator licensing requirements. For example, the example vacuum collection vehicles may have a sufficiently low weight (less than 26,000 pounds with the transported collected material) to avoid the need for a commercial driver's license. Forming the walls of the vacuum container from a lower gauge or thinner material reduces weight but may subject the walls to deformation due to the vacuum created within the vacuum container. The example vacuum collection vehicles include additional strength fortifying structures to facilitate the lower weight vacuum container while maintaining sufficient strength to withstand the vacuum forces formed within the vacuum container. In some implementations, angled braces or struts extend between and connect the side walls and ceiling of the vacuum container at spaced locations along the length of the vacuum container. Such struts increase strength of the vacuum container without impairing the ability of an operator to withdraw the sometimes large and bulky collection receptacles from the interior of the vacuum container.

In some implementations, the example vacuum collection vehicles may include reinforcement posts projecting from the floor within the vacuum container adjacent to an inner side of an exterior door of the vacuum container. Such reinforcement posts may be withdrawable from the floor so as to not interfere with withdrawal of the collection vehicles through the exterior door. In some implementations, such reinforcement posts may be pivotable between door engaging and reinforcing position and a collapsed or retracted position in which the reinforcement posts extend parallel to the floor or within a channel or groove formed within the floor of the vacuum container. In some implementations, additional reinforcement posts may project from the ceiling of the vacuum container and into engagement with an interior side of the exterior door.

The example vacuum collection vehicles may provide enhanced monitoring of and access to the interior of the vacuum container. In some implementations, the example vacuum collection vehicles may include sensors that output signals indicating an amount of the collected material at each of the different locations within the vacuum container that receive collected material from the different discharge conduits. In some implementations, the sensors may detect the amount of collected material within the collection receptacles. In some implementations, the sensors may comprise cameras, such as low light or infrared cameras. The signals output by the sensors may be transmitted to a portable electronic device, such as a laptop or smart phone, allowing an operator to check or monitor the fill state of the different locations of the vacuum container or the different collection receptacles within the vacuum container. In some implementations, signals output by the sensors may be transmitted, in a wired or wireless fashion, to a status indicator that is external to the interior of the vacuum container. The status indicator may comprise a display or monitor, a light-emitting diode serving as an optical indicator, an auditory indicator or the like on an external side of the vacuum container or in the cab of the vehicle (when provided).

In some implementations, the signals from the sensor or multiple sensors may be communicated to a controller that automatically switches between supplying the collected material to the first location or supplying the collected material to a second location based upon the status of the amount of collected material at the different locations. For example, each of the discharge conduits may be connected to a valve which selectively connects a connection hose to either of the discharge conduits. The controller may automatically output control signals, based upon signals from the sensor, controlling operation of the valve and controlling where the material being collected (through the suction of the collection hose) is deposited within the vacuum container. For example, when signals from the sensor indicate that the first location or the collection receptacle at the first location is becoming sufficiently full (the level of the collected material within the collection receptacle has exceeded a predetermined threshold height), the controller may output control signals to the valve causing the valve to occlude and terminate flow through a first discharge conduit to the first location or first collection receptacle and open and initiate flow through a second discharge conduit to the second location or second collection receptacle which may have capacity for receiving additional collected material.

Enhanced access to the interior of the vacuum container may be further provided with the provision of a flexible dust/fiber containment wall. In one implementation, the flexible containment wall is formed from a pair of flexible overlapping access flaps (sometimes referred to as a Z-door) within the vacuum container, between the exterior door of the vacuum container and the different locations at which the collected materials are deposited within the interior of the vacuum container. The overlapping flexible access flaps may form an isolation wall between the exterior door and the outlets of the discharge conduits. At the same time, the overlapping flexible flaps permit an operator to temporarily bend the flexible flaps and pass between the flexible flaps to gain access to the interior of the vacuum container with a reduced likelihood of airborne material escaping through the opened exterior door of the vacuum container. The flexible containment wall assists in maintaining negative pressure ("negative air") within the vacuum container when the exterior door is temporarily opened for access such that air is drawn into the container to inhibit the escape of airborne material.

FIG. 1 is a schematic diagram schematically illustrating portions of an example vacuum collection vehicle 20. Vacuum collection vehicle 20 comprises chassis 22, vacuum container 28, filter unit 32 and pneumatic discharge system 36. Chassis 22 comprises a frame that underlies and supports the remaining components of vacuum collection vehicle 20. Although not shown, chassis 22 may be connected to a set of wheels for movably supporting chassis 22 for ground travel. In some implementations, chassis 22 includes a tongue or other mechanism for facilitating the towing of chassis 22. In some implementations, chassis 22 further supports a propulsion unit, such as an internal combustion engine or motor for driving wheels that movably support chassis 22. In some implementations, chassis 22 may further supporting cab where an operator may sit and drive vehicle 20.

Vacuum container 28 comprises a generally sealed enclosure supported by chassis 22. Vacuum container 28 may comprise interior walls that include a floor, a roof, and side walls. In some implementations, vacuum container 28 may include a front wall and a rear exterior door. In some implementations, vacuum container 28 is sufficiently sized to contain multiple collection receptacles. In such implementations, vacuum container 28 may have an internal volume, extending from a rear of filter unit 32 to the rear of vacuum container 28, sufficiently sized to hold at least four receptacles, such as receptacles 171 described hereafter. In some implementations, vacuum container 28 may have an internal volume, extending from a rear of filter unit 32 to the rear of vacuum container 28 of at least 500 cubic feet. In some implementations, vacuum container 28 is formed from aluminum, steel, or other materials. As will be described hereafter, in some implementations, vacuum container 28 may be further strengthened through the use of posts, braces and the like.

In some implementations, vacuum container 28 comprises a modified conventional steel shipping/cargo container. Such container may have an overall volume of at least 1,150 cubic feet. Such modifications include altering the length of the container and adding additional structural reinforcements as will be described hereafter. In such implementations, the side walls, roof, and front wall of container 28 are made from 14-gauge, 0.075-inch corrugated sheet steel panels that are welded to a main structure. In such an implementation, top and bottom side rails and end frames may be formed from 7 gauge tubular steel. In other implementations, back container 28 may be formed from other materials.

Filter unit 32 filters air being withdrawn from the interior of vacuum container 28 to create the vacuum within vacuum container 28. Filter unit 32 is at least partially within the vacuum container 28 and comprises filter 40 and filter housing 44. In one implementation, filter 40 may comprise a high-efficiency particulate air (HEPA) filter. In one implementation, filter 40 may comprise multiple different filter materials formed in different layers that are stacked or overlap one another. In some implementations, filter 40 may comprise multiple sections or panels that extend edge-to-edge or that are arranged in a grid so that form a larger overall filter.

Filter housing 44 supports filter 40 and forms a post filter interior 46 adjacent a side or face a filter 40 and a port 48. Port 48 provides an air passage between the post filter interior 46 and a vacuum source. The vacuum source draws air from interior 46, further drawing air from within the interior of vacuum container 28 through filter 40 to create a vacuum within the interior of vacuum container 28.

Filter housing 44 is supported within vacuum container 28 independent of opposing interior walls. In some implementations, filter housing 44 may have an open end that is sealed to and adjacent a rear wall of vacuum container 28. In some implementations, filter housing 44 may have an open top that is sealed and joined to the ceiling of vacuum container 28. In some implementations, filter housing 44 may have an open bottom that is sealed and joined to the floor of vacuum container 28. In some implementations, filter housing 44 may have an open end and an open bottom abutting and sealed to a rear wall and a ceiling, respectively, of vacuum container 28. In some implementations, filter housing 44 may have a floor that is elevated or on top of the floor of vacuum container 28 while having an open and that is joined to the rear wall of that container 28.

Because filter housing 44 is not physically mounted or connected to two opposing interior walls of vacuum container 28, the seals between the filter housing and the supporting interior wall(s), which seal between the post filter interior 46 and the main interior of the vacuum container 28, are subject to less torque and less stress during transport of the vehicle 20 which may reduce the likelihood of damage or stress to the seals. By maintaining the integrity of the seals, the vacuum collection vehicle 20 ensures a greater portion of the air being drawn from the vacuum container 28, to create the vacuum within the vacuum container 28, passes through the filter 40 to discharge cleaner air to the outside environment.

Pneumatic discharge system 36 is connectable to a collection hose which suctions the material being collected and directs the material being collected to pneumatic discharge system 36. Pneumatic discharge system 36 further directs the collected material to selected locations within the interior of vacuum container 28. Pneumatic discharge system 36 comprises discharge conduits 50-1 and 50-2 (collectively referred to as conduits 50).

Discharge conduits 50 comprise hoses, piping, plenums, or the like extending from ports through a wall or walls of vacuum container 28 to different locations within the interior of vacuum container 28. In some implementations, discharge conduits 50 are formed along the ceiling or roof of the interior of vacuum container 28, wherein such conduits further drop down for delivering to a particular location or into a collection receptacle. Discharge conduit 50-1 extends to a first location 52-1 while discharge conduit 50-2 extends to a second location 52-2. As indicated by broken lines, some implementations, locations 52-1 and 52-2 may correspond to the locations of collection receptacles, such as bags, bins, tubs, containers, or the like.

Although vacuum collection vehicle 20 is illustrated as having two discharge conduits 50 for delivering collected material to two different locations, in other implementations, collection vehicle 20 may have greater than two of such discharge conduits 50. Although illustrated as extending from a side wall of vacuum container 28, in other implementations, discharge conduits 50 may extend from a front wall, a rear wall or a roof of that container 28. In some implementations, discharge conduit 50 may extend from multiple different walls of vacuum container 28. In some implementations, discharge conduits 50 each have an internal diameter of at least 5 inches with an internal cross-sectional area through which material may flow of at least 19 square inches, and nominally a diameter of 6 inches.

Figure 2A:
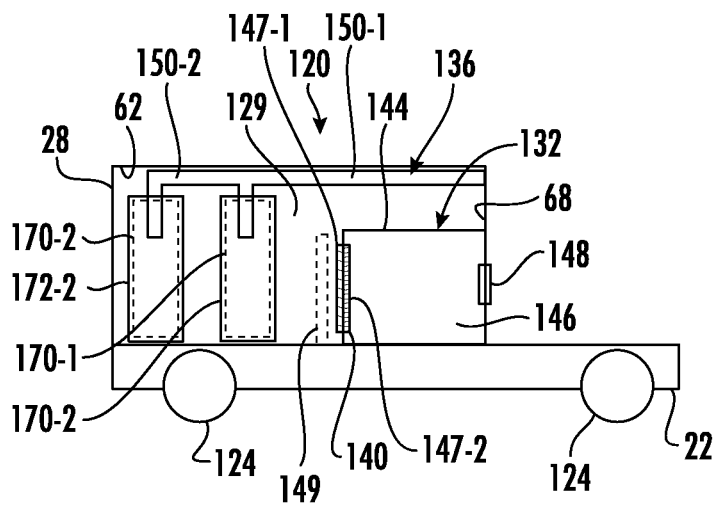
Figure 2B:
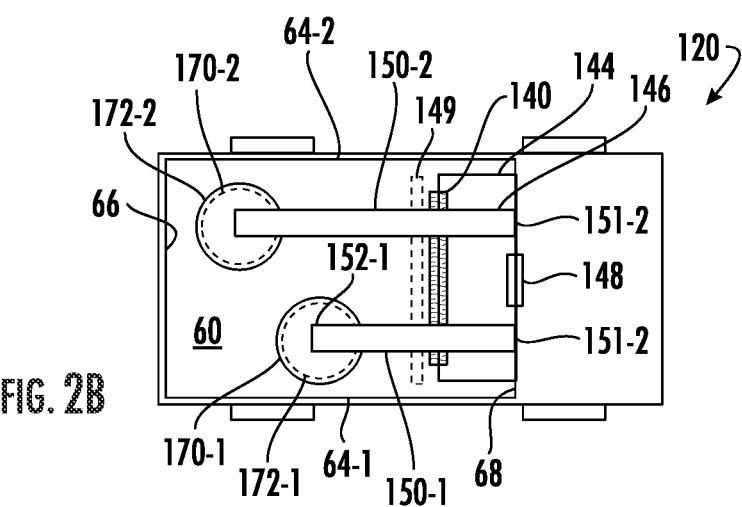

FIGS. 2A and 2B schematically illustrate portions of an example vacuum collection vehicle 120. FIGS. 2A and 2B illustrate an example of how a filter unit may be configured and how discharge conduits may be routed within the interior of the vacuum container. Vacuum collection vehicle 120 comprises chassis 22, wheels 124, vacuum container 28, filter unit 132, pneumatic discharge system 136, inner collection receptacles 170-1, 170-2 (collectively referred to as receptacles 170), and outer collection receptacles 172-1, 172-2 (collectively referred to as receptacles 172).

Chassis 22 is described above and is shown as being movably supported by wheels 124. As noted above, chassis 22 may be configured to be towed by a truck or other separate vehicle or may be part of a self-propelled vehicle having a propulsion unit such as a motor or internal combustion engine to propel a pair of the wheels. Vacuum container 28 is described above. As shown by FIGS. 2A and 2B, vacuum container 20 has an interior 129 defined by interior walls including floor 60, roof 62, side walls 64-1, 64-2 (collectively referred to as side walls 31), rear wall 66, and front wall 68. In some implementations rear wall 66 may be provided with the rear exterior door. In some implementations, front wall 68 may be a wall that is shared with another container (the shared wall also serving as a wall of the other container), such as a storage container, in front of vacuum container 28.

Filter unit 132 filters air being withdrawn from the main interior 29 of vacuum container 28 to form a vacuum within interior 29. Filter unit 132 reduces the amount of airborne collected material being discharge to the outside environment surrounding vehicle 120. Filter unit 132 comprises filter 140, filter housing 144 and preliminary filter 147.

Filter 140 comprises a two-stage filter composed of a first filter panel 147-1 and a second filter panel 147-2 which are stacked in an overlapping fashion. Filter 140 extends generally perpendicular to the side walls 64 of vacuum container 28, facing the rear wall 66 of vacuum container 28. In some implementations, first filter panel 147-1 comprises 27 square feet of filter media while the second filter panel 147-2 comprises 430 square feet of filter media, wherein filter panels may comprise corrugated or pleated layers of material. The planar surface area may be formed by a single panel or multiple panels arranging the grid-like fashion. For example, in some implementations, panel 147-1 may be formed from multiple 4" by 24"×24" MERV rated pre-filters arranged in a grid while panel 147-2 may be formed from multiple 12"×24"×24" high-capacity HEPA filters arranged in a grid.

Filter housing 144 is similar to filter housing 44 described above. Filter housing 144 is supported within interior 129 of vacuum container 28 independent of opposing interior walls. In the example illustrated, filter housing 144 is supported by floor 60 and front wall 68, having an open rear that is sealed against front wall 68. In some implementations, filter housing 144 may have an open bottom that is sealed against floor 60. In some implementations, filter housing 144 is screwed, bolted, welded, or otherwise joined to floor 60 and front wall 68. In some implementations, filter housing 144 may simply rest upon floor 60 (without being fastened or fixed to floor 60) or may be suspended above floor 60, being cantilevered from front wall 68. In the example illustrated, filter housing 144 forms vacuum port 148 extending through front wall 68 for connecting a vacuum source to post filter interior 146.

Prefilter 149 comprises a preliminary filter, configured to permit the passage of larger particles/fibers therethrough as compared to the size of particle/fibers transmissible through filter 140, such that prefilter 149 removes larger particles/fibers and reduces the buildup of such larger particles/fibers on the face of filter 140. Prefilter 149 extends across filter 140. In some implementations prefilter 149 is flexible and is wrapped about or over filter housing 144, across filter 140, providing additional filtering layer. In some implementations come prefilter 149 may be separately mounted or supported across filter 140. In some implementations, prefilter 149 may be omitted.

Pneumatic discharge system 136 is similar to pneumatic discharge system 36 except that system 136 comprises discharge conduits 150-1 and 150-2 (collectively referred to as conduits 150). In some implementations, each of conduits 150 have an inner diameter with a cross-sectional area of at least 19 square inches and nominally 28 square inches. Conduits 150 extend from ports 151-1 and 151-2 located in front wall 68 above filter support 144. Conduits 150 extend side-by-side along ceiling 62 of vacuum container 28. Conduit 150-1 extends to a first location 152-1 for discharging collected material into inner collection receptacle 170-1. Conduit 150-2 extends to a second location 152-2 for discharging collected material into inner collection receptacle 170-2.

Inner collection receptacles 170 and 172 are located at the different locations within the vacuum container. Such collection receptacles 170, 172 facilitate withdrawal and disposal of the collected material, potentially hazardous, at a landfill or other disposal site. Inner collection receptacles 170 each comprises an inner air transmissive or perforated vacuum or filter bag through which air may be drawn, but wherein the material being collected is too large to pass through the perforations or fabric of the perforated vacuum or filter bag. In some implementations, the inner collection receptacle 170 may comprise a bag having walls formed from a material such as polypropylene and having a capacity of at least 50 cubic feet and no greater than 75 cubic feet. In some implementations, inner collection receptacle 170 has perforations sufficiently small so as to block particles or fibers having a size greater than 1 micron. During use, the original perforation size may stretch to a slightly enlarged size. As a result, inner collection receptacle 170 in combination with filter 140 and prefilter 149 form a four-stage filter.

Outer collection receptacles 172 each comprises an outer non-air transmissive or imperforate bag which is to surround the perforated vacuum bag. Each outer collection receptacle 172 forms an imperforate seal or barrier about the inner collection receptacle 170, facilitating its disposal at a landfill or other disposal site. In some implementations, during material collection, the outer collection receptacle 172 is collapsed adjacent to floor 60, facilitating airflow through the inner collection receptacle 170. When material collection has been completed, the outer collection receptacle 172 is pulled up over in about the inner collection receptacle 170. As will be described hereafter, in some implementations, the outer collection receptacle 172 may alternatively be supported alongside and about the inner collection receptacle 172 during filling of the inner collection receptacle 172 by receptacle supports, wherein a sufficient space between the mouths of the receptacles 171, 172 is established such that the outer collection receptacle 172 does not impair or hinder the suction of air through the walls of the surrounded inner collection receptacle 170. In such implementations, the radial distance between the mouths of the receptacles 170, 172 is at least 6 inches, and nominally between 18 and 24 inches.

Figure 3A:
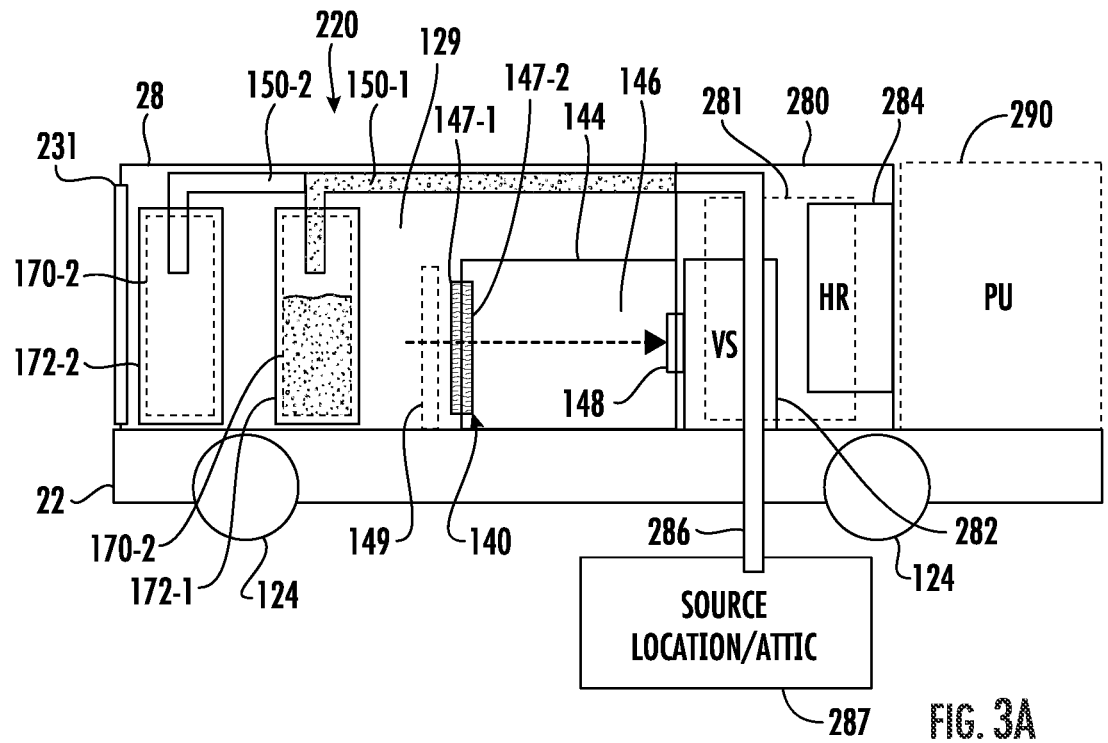
Figure 3B:
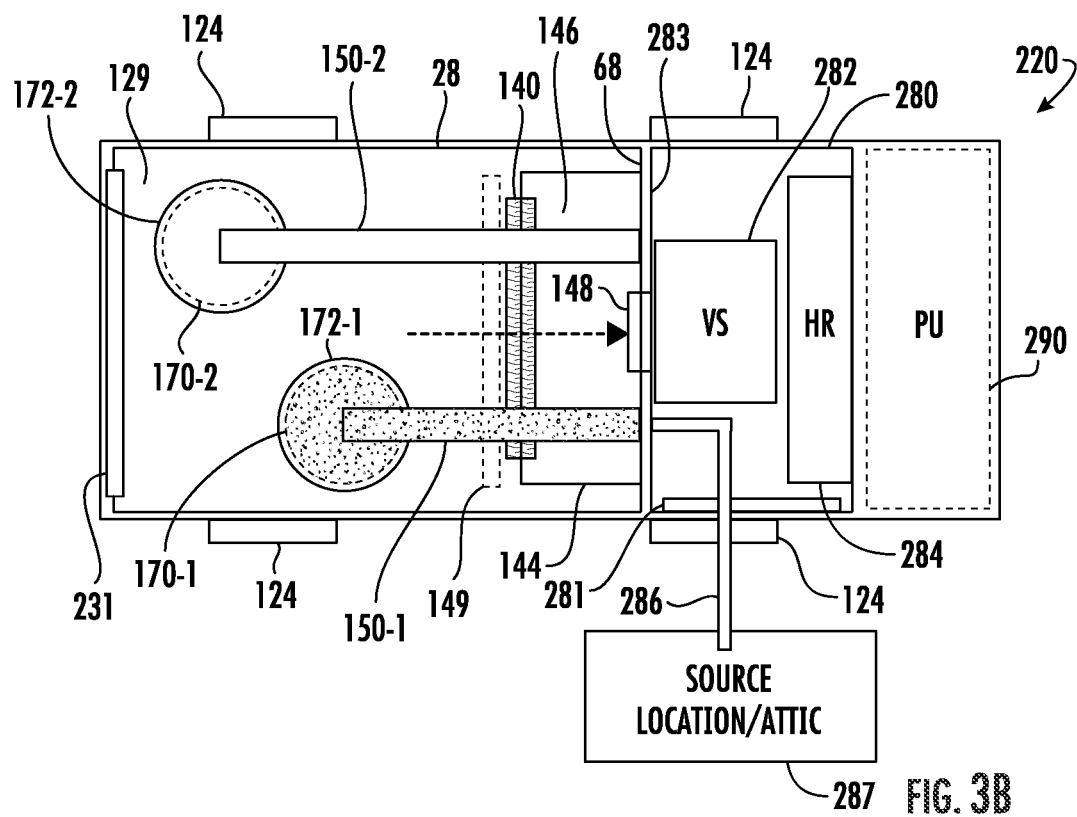

FIGS. 3A and 3B schematically illustrated portions of an example vacuum collection vehicle 220. FIGS. 3A and 3B illustrate an example of how the chassis may additionally support a storage container in front of the vacuum container to reduce reliance upon additional vehicles for transporting other equipment such as an external vacuum source and collection hoses. The storage container may additionally provide easier access to the ports of the discharge conduits, reducing reliance upon ladders for such access. The storage container additionally shields the ports and an operator from the sun, rain, snow, and wind. Vacuum collection vehicle 220 is similar to vacuum collection vehicle 120 described above except that vacuum collection vehicle 220 additionally comprises storage container 280, vacuum source 282 and collection hose reel 284. In the example illustrated, vacuum container 28 additionally comprises a rear exterior door 231 which may comprise a single door or a pair of doors that swing open to provide access to interior 129 of vacuum container 28.

Storage container 280 is supported by chassis 22 in front of vacuum container 28. In the example illustrated, storage container 280 comprises a rear wall 283 that extends alongside front wall 68 of vacuum container 28. In other implementations, storage container 280 and vacuum container 28 may share a common wall therebetween. Storage container 280 includes a side door 281 for providing operator access to the interior of storage container 280. In the example illustrated, storage container 280 and side door 281 are sufficiently sized to allow an operator to enter the interior of storage container 280.

Vacuum source 282 comprises a source that draws air out of the interior 129 of vacuum container 28, through filter 140. In some implementations, vacuum source 282 comprises an impeller or multiple impellers that are rotatably driven to draw air out of vacuum container 28. In some implementations, vacuum source 282 may comprise a gas motor vacuum, an electric motor vacuum or a power-take-off (PTO) driven vacuum. In some implementations, vacuum source 282 is mounted in place within storage container 280.

Hose reel 284 comprises a real which the rotatably supported within storage container 280. Hose reel 284 facilitates the winding of collection hose 286 for storage and for transport. In FIGS. 3A and 3B, storage container 280 is illustrated as passing through the opened door 281 and connected to the port of discharge conduit 150-1. The suction end of collection hose 286 may be extended to a source location 287 (shown in broken lines), such as the attic of a structure having material, such as asbestos, being removed and collected. Upon inner collection receptacle 170-1 becoming sufficiently filled with the collected material, collection of 286 may be disconnected from discharge conduit 150-1. The port of discharge conduit 150-2 may be opened and the collection hose 286 may be attached are connected to the now opened port of discharge conduit 150-2 for delivering collected material to the inner collection receptacle 170-2. Upon disconnection of the collection host 286 from the port of discharge conduit 150-1, the port of discharge conduit 150-1 is plugged or closed such that air being drawn into interior 129 is largely limited to air being drawn through discharge conduit 150-2. As should be appreciated, this process may be reversed in circumstances where inner collection receptive 170-2 is first filled.

In some implementations, depending upon the amount of vacuum created within interior 129 by vacuum source 282, two collection hoses 286 may be concurrently connected to respective discharge conduits 150 to facilitate concurrent collection of the collected material using both collection hoses 286 and both conduits 150. Although vacuum collection vehicle 220 is illustrated as including two discharge conduits 150, vehicle 220 may include greater than two of such conduits 154 discharging collected material at more than two different locations within interior 129 of vacuum container 28.

The provision of vacuum source 282 and hose reel 284 in storage container 280 reduces reliance upon additional vehicles for supplying such equipment for the collection and removal of material, such as hazardous material. As a result, such removal and collection are less complex and less costly. As shown by broken lines, in some implementation, chassis 22 may additionally support a propulsion unit 290 which results in vehicle 220 being a self-propelled vehicle. Propulsion unit 290 may comprise an internal combustion engine (ICE) or an electric motor (M) for driving either front wheels or rear wheels 124. In such implementations, chassis 22 may additionally support a cab for seating an operator.

FIGS. 4-8 schematically illustrate portions of an example vacuum collection vehicle 320. Although vehicle 320 includes all of the features shown in FIGS. 4-8, some of the illustrated features shown in some figures are omitted from other figures for ease of illustration. FIGS. 4-8 illustrate an alternative configuration for a filter unit, examples of how the inner and outer collection receptacles may be supported to overcome challenges pertaining to the sealing of internal collection receptacles, examples of how enhanced access may be provided to the interior of the vacuum container, examples of how the fill state of collection receptacles within vacuum container 28 may be monitored, examples of how the delivery of collected material may be automatically switched between different locations within the interior of vacuum container 28, and examples of how the vacuum container may be strengthened to reduce the overall weight of the vacuum container for reducing fuel or energy consumption and for reducing operator licensing requirements. As with all of the figures of the present disclosure, those components of FIGS. 4-8 which correspond to components of earlier implementations are numbered similarly. Vacuum collection vehicle 320 is similar to vacuum collection vehicle 220 except that vacuum collection vehicle 320 comprises filter unit 332 in place of filter unit 132 and additionally comprises inner collection receptacle supports 400, outer collection receptacle supports 402, access flaps 404, sensors 408-1, 408-2, 410-1, 410-2, fill state indicator 412, valve 414, controller 416, braces 420 and reinforcement posts 422-1, 422-2.

Filter unit 132 filters air being withdrawn from the main interior 129 of vacuum container 28 to form a vacuum within interior 129. Filter unit 332 reduces the amount of airborne collected material being discharge to the outside environment surrounding vehicle 320. Filter unit 332 comprises filters 340, filter housing 344 and preliminary filters 347.

Filters 340 comprise a pair of filters supported by filter housing 344 at spaced locations on opposite sides of a post filter interior 346. In the example illustrated, filters 340 extend parallel to one another, facing the side walls 64 of vacuum container 28. In some implementations, filter 340 may return to the extend at angles oblique relative to one another while still facing the opposite side walls 64 of vacuum container 28. Because filters 340 extend in a direction parallel to or otherwise along the longitudinal axis of vacuum container 28, the length of filter 340 is not limited to the transverse width of back container 28, the distance between the opposing side walls 64 of vacuum container 28. Instead, filters 340 may extend by desired distance along the longitudinal length of vacuum container 28 which is greater than the transverse width of vacuum container 28. As a result, filters 340 may provide an enlarged surface area through which air may flow when being filtered. This may be especially advantageous in circumstances where the overall surface area of such filters 340 might otherwise be limited due to height restrictions caused by the provision of braces 420.

Similar to filter 140, each of filters 340 comprises a two-stage filter composed of a first filter panel 147-1 and a second filter panel 147-2 which are stacked in an overlapping fashion. In some implementations, first filter panel 147-1 comprises a filter media having a Minimum Efficiency Reporting Value of between 8 and 13 while the second filter panel 147-2 comprises HEPA. that filter panels may comprise corrugated or wavy layers of material. In some implementations, each of filter panels 147-1 and 147-2 have a face having a planar surface area of at least 16 square feet, providing a sufficient area for air flow into filter 340. The planar surface area may be formed by a single panel or multiple panels arranging the grid-like fashion. For example, in some implementations, panel 147-1 may be formed from multiple 4" by 24"×24" MERV rated pre-filters arranged in a grid while panel 147-2 may be formed from multiple 12"×24"×24" high-capacity HEPA filters arranged in a grid.

Prefilters 349 are similar to prefilters 149 described above. Prefilters 349 comprises panels or sheets of filtering material across and over the faces of filters 340 to provide an additional filtering stage. In some implementations, prefilters 349 comprise a polypropylene material. In some implementations, prefilters 349 may be omitted.

Filter housing 344 is similar to filter housings 44 and 144 described above. Filter housing 344 is supported within interior 129 of vacuum container 28 independent of opposing interior walls. In the example illustrated, filter housing 344 is supported by floor 60 and front wall 68, having an open rear that is sealed against front wall 68. In some implementations, filter housing 344 may have an open bottom that is sealed against floor 60. In some implementations, filter housing 344 is screwed, bolted, welded, or otherwise joined to floor 60 and front wall 68. In some implementations, filter housing 344 may simply rest upon floor 60 (without being fastened or fixed to floor 60) or may be suspended above floor 60, being cantilevered from front wall 68. In some implementations, filter housing 344 is formed by a pair of opposing spaced filter racks having individual compartments for supporting and framing individual filter panels in a grid-like arrangement. The pair opposing spaced filter racks extent on opposite sides of the post filter interior 346, which is further formed by a top wall and a rear wall spanning between the racks.

In the example illustrated, filter housing 344 forms a pair of vacuum ports 148, 151 extending through front wall 68 for connecting a vacuum source to post filter interior 146. Because vacuum ports 148, 151 are vertically stacked, one port above the other, the width of filter unit 332 may be reduced.

Figure 4:
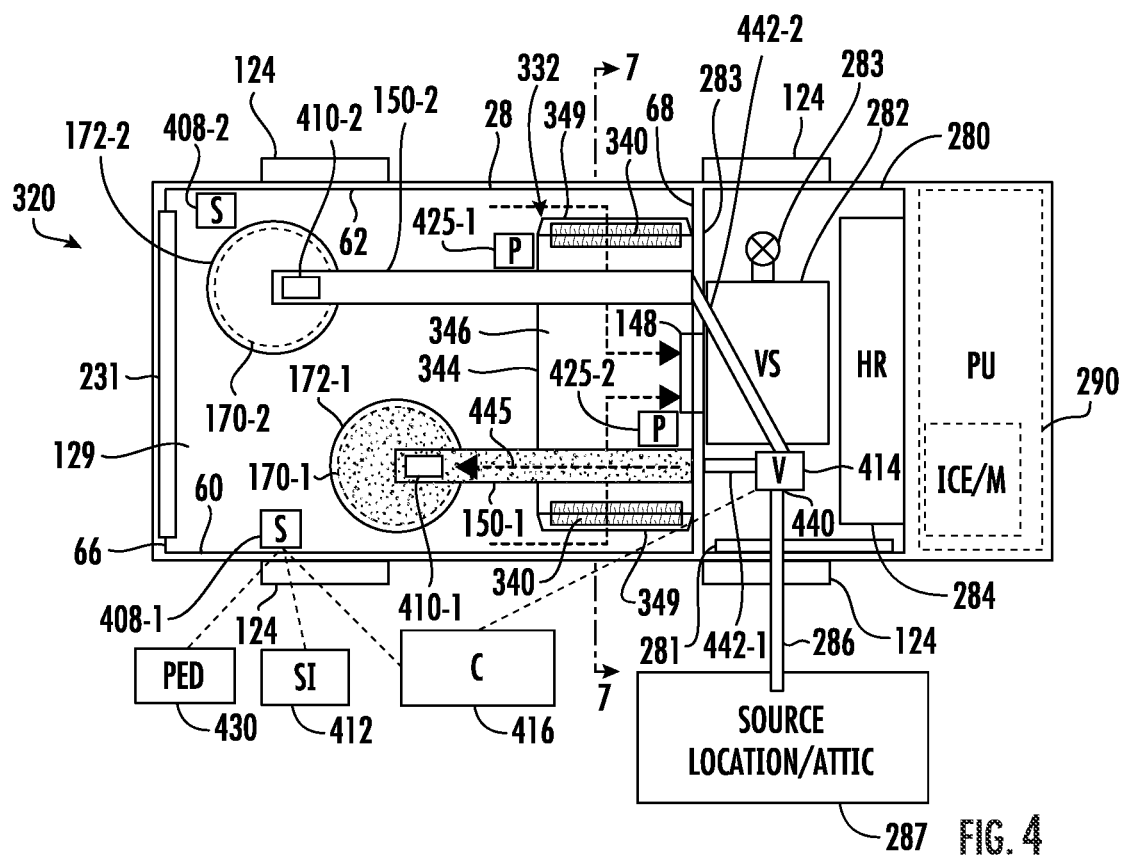

As schematically shown by FIGS. 4 and 7, vehicle 320 additionally comprises pressure sensors 425-1 and 425-2 (collectively referred to as sensors 4 to 5). Pressure sensor 425-1 senses the pressure within interior 129 of vacuum container 28. Pressure sensor 425-2 senses the pressure within the post filter interior 346 of filter unit 332. Sensors 425 facilitate monitoring of the state of filter unit 332. For example, a sufficient difference between the pressure values indicated by pressure sensors 425-1 and 425-2 may indicate blockage or occlusion of prefilters 349 or filter 340, indicating that such filters should be cleaned or replaced. Such blockage may reduce the overall vacuum formed within vacuum container 28. In some implementations, the vacuum created within interior 129 of vacuum container 28 is at least 20 inches H20 vacuum and no greater than 35 inches H20 vacuum. Such pressures facilitate the suction with sufficient lift for vacuuming of bulk materials using one connection hose 286 or two connection hoses 286 concurrently connected to two of discharge conduits for concurrent use. In such implementations, the vacuum created within post filter interior 346 is 1 inch to 2 inches H20 vacuum above the vacuum pressure being created within vacuum container 28.

In some implementations, the readout (the location where the dial gauge, digital or other measurement value may be optically observed by an operator) for pressure sensor 425-1 is located within interior 129 of vacuum container 28 or on the exterior of vacuum container 28. In some implementations, the readout for pressure sensor 425-2 is located along the interior side wall of storage container 280. In yet other implementations, pressure sensors 425 may transmit signals indicating the pressure readings to a display or other indicator, such as a monitor in the cab of the vehicle, and/or a monitor along an exterior side of vacuum container 28 or the like. In some implementations, controller 416 may receive such signals and may output signals causing an alarm or other alert in response to a pressure difference between the pressures read by sensor 425-1 in the pressure read by sensor 425-2 being greater than a predetermined threshold. For example, in some implementations, an alert may be output in response to the pressure difference exceeding a difference of 1.0 inches H20 vacuum.

Figure 5:
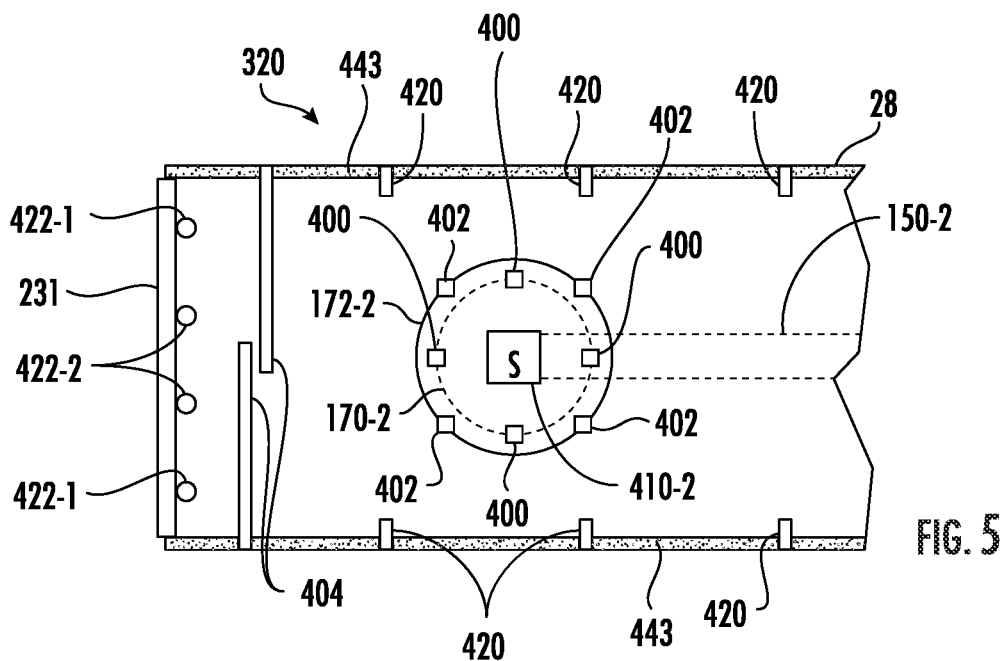

As shown by FIGS. 5 and 6, inner collection receptacle supports 400 are each located and configured so as to be mountable to the transmissive inner collection receptacle (vacuum or filter bag) 170 so as to support the inner collection receptacle 170 in an upright orientation. In some implementations, the inner collection receptacle support 400 holds open the mouth of an inner collection receptacle that is in the form of a filter bag. The outer collection receptacle supports 402 are located and configured so as to be mountable to the outer non-transmissive or imperforate collection receptacle 172 while supporting the outer collection receptacle 172 about and spaced from the inner collection receptacle 170. The outer collection receptacle supports 402 support the outer collection receptacle 172 so as to form a sufficient space between the mouth of the outer collection receptacle 172 and the mouth of the inner collection receptacle 170 for the passage of air through the filter bag and out through the space between the mouth of the outer collection receptacle and the mouth of the inner collection receptacle. In one example implementation, the spacing S is at least 6 inches, and nominally between 18 inches and 24 inches.

In some implementations, the inner collection receptacle supports 400 and the outer collection receptacle supports 402 each comprise a series of clips, hooks, hangers or the like that snap, hook or otherwise engage portions of the respective inner and outer collection receptacles proximate the mouths of the inner and outer collection receptacles. In the example illustrated, the inner collection receptacle supports 400 and the outer collection receptacle supports 402 are each suspended from the ceiling or roof 62 of the vacuum container 28. In some implementations, inner collection receptacle supports 400 and the outer collection receptacle supports 402 project upwardly from the floor 60 of the vacuum container 28 to a height for engaging those portions of the respective containers proximate the mouths of the respective containers. In some implementations, the inner collection receptacle supports 400 and the outer collection receptacle supports 402 may be cantilevered or project from the interior side walls 64 of the vacuum container 28 at a height for engaging portions of the respective receptacles 170, 172 proximate the mouths of the respective receptacles 170, 172.

The example vacuum collection vehicle 320 provides enhanced access to the interior of the vacuum container. Enhanced access to the interior of the vacuum container 28 is provided with the provision of a pair of flexible overlapping access flaps 404 (sometimes referred to as a Z-door) within the vacuum container 28, between the exterior door 231 of the vacuum container 28 and the different locations at which the collected materials deposited within the interior 129 of the vacuum container 28. The overlapping flexible access flaps 404 may form an isolation wall between the exterior door 231 and the outlets of the discharge conduits 150. At the same time, the overlapping flexible access flaps 404 permit an operator to temporarily bend the flexible flaps 404 and pass between the flexible flaps 404 to gain access to the interior 129 of the vacuum container 28 with a reduced likelihood of airborne material escaping through the opened exterior door of the vacuum container 28.

The example vacuum collection vehicle 320 further provides enhanced monitoring of the fill state of receptacles 170 within vacuum container 28. Sensors 408 and 410 output signals indicating a fill state of receptacles 170. Sensors 408 are mounted to the ceiling 62 and/or side walls 64 of vacuum container 28. Sensors 410-1 and 410-2 are mounted to the underside of respective discharge conduits 150-1 and 150-2 so as to directly overlie the mouths of receptacles 170-1 and 170-2, respectively. Sensors 408-1 and 410-1 monitor the fill state of receptacle 170-1 while sensors 408-2 and 410-2 monitor the fill state of receptacle 170-2.

In some implementations, the sensors 408, 410 may comprise cameras, such as low light or infrared cameras. The signals output by the sensors 408, 410 may be transmitted to a portable electronic device 430, such as a laptop or smart phone, allowing an operator to check or monitor the fill state of the different locations of the vacuum container 28 or the different collection receptacles 170 within the vacuum container 28. In some implementations, signals output by the sensors 408, 410 may be transmitted, in a wired or wireless fashion, to fill state indicator 412 that is external to the interior of the vacuum container 28. The fill state indicator foreign to may comprise a display or monitor, a light-emitting diode serving as an optical indicator, an auditory indicator or the like on an external side of the vacuum container 28 or in the cab of the vehicle (when provided).

Valve 414 controls the passage of air to either (or both) of discharge conduits 150-1, 150-2. Valve 414 comprises an inlet port 444 connection to collection hose 286. Valve 414 further comprises valve conduits 442-1, 442-2 connected to discharge conduits 150-1 and 150-2, respectively. Valve 414 comprises an internal plate, baffle or the like which is movable between a first position in which flow from port 440 is directed to discharge conduit 150-1, a second position in which flow from port 440 is directed to discharge conduit 150-2 and a third position which flow from port 440 is concurrently directed to both of conduits 150. In some implementations, valve 414 may alternatively comprise a two-way valve wherein flow from port 440 is directed to one or the other of conduits 150-1, 150-2. Valve 414 facilitates the switching of material flow between conduits 150-1 and 150-2 with less operator involvement.

Controller 416 comprises a processing unit that follows instructions contained in a non-transitory computer-readable medium. Controller 416 receives signals from sensors 408 and 410. Based upon such signals, controller 416 automatically outputs control signals to valve 414 to switch material flow between discharge conduits 150-1 and 150-2. For example, in some implementations, when signals from the sensors 408 and/or 410 indicate that the first location or the collection receptacle 170-1 at the first location is becoming sufficiently full (the level of the collected material 445 within the collection receptacle 170-1 has exceeded a predetermined threshold height), the controller 416 may output control signals to the valve 414 causing the valve 414 to occlude and terminate flow through a first discharge conduit 150-1 to the first location or first collection receptacle 170-1 and open and initiate flow through a second discharge conduit 150-2 to the second location or second collection receptacle 170-2 which may have capacity for receiving additional collected material 445. In some implementations, such witching may be manually carried out based upon information obtained from fill status indicator 412 and/or portable electronic device 430 without the use of controller 416. In some implementations, such flow switching may be overridden by an operator. In some implementations, controller 416 may be omitted where such manual switching is performed. In some implementations, fill state indicator 412 or the use of portable electronic device 430 may be omitted where such flow switching is controlled by controller 416.

In some implementations, the example vacuum collection vehicle 320 has a sufficiently low weight to reduce fuel or energy consumption during travel and to reduce operator licensing requirements. For example, the example vacuum collection vehicle 320 may have a sufficiently low weight (less than 26,000 pounds with the transported collected material) to avoid the need for a commercial driver's license. Forming the walls of the vacuum container 28 from a lower gauge or thinner material reduces weight but may subject the walls to deformation due to the vacuum created within the vacuum container. The example vacuum collection vehicles include additional strength fortifying structures to facilitate the lower weight vacuum container 28 while maintaining sufficient strength to withstand the vacuum forces formed within the vacuum container. As shown by FIGS. 5-7, the example vacuum collection vehicle 320 comprises angled braces 420 that extend between and connect the side walls 64 and ceiling 62 of the vacuum container 28 at spaced locations along the length of the vacuum container 28. Such struts or braces 420 increase strength of the vacuum container 28 without impairing the ability of an operator to withdraw the sometimes large and bulky collection receptacles from the interior of the vacuum container.

In the particular example shown in FIG. 7, braces 420 are each part of a larger C-bracket 470 which provides additional strength to the side walls and roof of vacuum container 28. In the example illustrated, each C-bracket 470 comprises a roof brace 472 extending along ceiling 62 and connected it opposite ends to the opposing braces 420. Each C-bracket 470 further comprises wall braces 474 that vertically extend alongside walls 64 of vacuum container 28. Each wall brace 474 as an upper end connected to a corresponding one of braces 420 and a lower end mounted to the floor 60 of vacuum container 28 by an L-shaped floor bracket 476. C-brackets 470 are located at spaced locations along the longitudinal length of vacuum container 28. C-brackets 470 strengthen and rigidify the side walls and roof of vacuum container 28 such that the side walls and roof of vacuum container 28 may be made from a lighter weight material for example, C-brackets 470 provide sufficient strength to the side walls and roof of a standard steel shipping/cargo container having walls made from 14 gauge, 0.075 inch corrugated steel sheet panels such that the modified steel shipping/cargo container may withstand the internal vacuum generated within the interior of the container. In such implementations, the vacuum created within interior 129 of container 28 may be at least 20 inches H20 vacuum pressure to suction the material being collected at a satisfactory rate. As result, the modified steel shipping/cargo container forming vacuum container 28 is sufficiently strong to withstand the internal vacuum used to suction the material being collected, but is also sufficiently light to reduce energy consumption to transport vehicle 320 and to potentially reduce operator licensing requirements otherwise required to operate vehicles having a weight greater than a predetermined threshold, such as a weight greater than or equal to 26,000 pounds.

As further shown by FIG. 7, in the example illustrated, the front wall 68 of container 28 is further reinforced with an angle iron or L-shaped bracket 478 (shown in broken lines) extending across the transverse width of wall 68. In one implementation, bracket 478 is mounted external to the interior 129 of vacuum container 128, across the interior rear wall of storage container 280, opposite to front wall 68 of vacuum container 28. For example, bracket 478 may have ends bolted or joined to the vertical corner posts along the rear wall of storage container 280 and may have intermediate portions bolted to front wall 68 with bolts passing through front wall 68. In some implementations, vehicle 320 may be provided with additional similar reinforcement brackets for further supporting rigidifying front wall 68 or other walls vacuum container 28 to enhance ability of vacuum container 28 withstand the vacuum pressures created by vacuum source 282.

As shown by FIGS. 5, 6 and 8, the example vacuum collection vehicle 320 comprises reinforcement posts 422-1 and 422-2 (collectively referred to as posts 422). Posts 422 limit the extent to which exterior door 231 (whether a single door or a pair of door halves) may be flexed or drawn inward as a result of the vacuum within vacuum container 28. Reinforcement posts 422-1 extend from the ceiling 62 of the vacuum container 28 and into engagement with an interior side of the exterior door 231. In some implementations, reinforcement posts 422-1 may be replaced with an L-shaped angle iron or support bracket mounted to the rear wall or ceiling of vacuum container 28 and having a leg that extends into the door opening so as to abut an interior side of the door 231, when closed.

Reinforcement posts 422-2 project from the floor 60 within the vacuum container 28 adjacent to an exterior door 231 of the vacuum container. As shown by FIG. 8, reinforcement posts 422-2 are received within floor openings 454 in an upright orientation and are withdrawable from the floor (as shown by arrow 456) so as to not interfere with withdrawal of the collection vehicles through the exterior door 231. Upon being withdrawn, posts 422-2 do not project upward from the floor where they might otherwise catch upon receptacles being withdrawn from back in container 28.

As shown by FIG. 9, in some implementations, such reinforcement posts 422-2 may be pivotable between door engaging and reinforcing position (shown in solid lines) and a collapsed or retracted position (shown in broken lines) in which the reinforcement posts extend parallel to the floor 60 or within a channel or groove 458 formed within the floor 60 of the vacuum container 28. In the example illustrated, posts 422-2 pivot about an axis 460 perpendicular to the plane of door 231 (which pivots about a hinge 461) in some implementations, additional reinforcement posts may project from the side wall 64 of vacuum container 28. Such reinforcement posts may be withdrawable similar to the reinforcement posts 422-2 shown in FIG. 8 or may be pivotable between projecting and retracted positions similar to the reinforcement posts 422-2 shown in FIG. 9.

As shown by FIG. 4, vacuum collection vehicle 320 further dampens noise levels that may exist within storage container 280 due to the operation of vacuum source 282. In the example illustrated, the air discharge outlet of vacuum source 282 is connected to a floor port 285 within the floor of storage container 280. This results in the decibel level within storage container 280 being reduced. In other implementations, vacuum source 282 may include a discharge port that discharges air into the interior of storage container 280 or is connected to a hose that discharges air through the opening of door 281.

As further shown by FIG. 4, in some implementations, the interior walls of storage container 280 are lined with a soundproofing material 443. The soundproofing material 443 may be in the form of soundproofing panels. For example, in some implementations, the interior of storage container may be lined with a cellulose fiber panel having a thickness of 1 inch or greater. In some implementations, the panels may comprise Homasote 440 SoundBarrier 1"×4'×8' Sound Deadening panels fastened, bonded otherwise secured along the interior of storage container 280. In some implementations, such panels may line the floor, front wall, ceiling, and side walls of storage container. In some implementations, soundproofing material 443 may be omitted.

Figure 10:
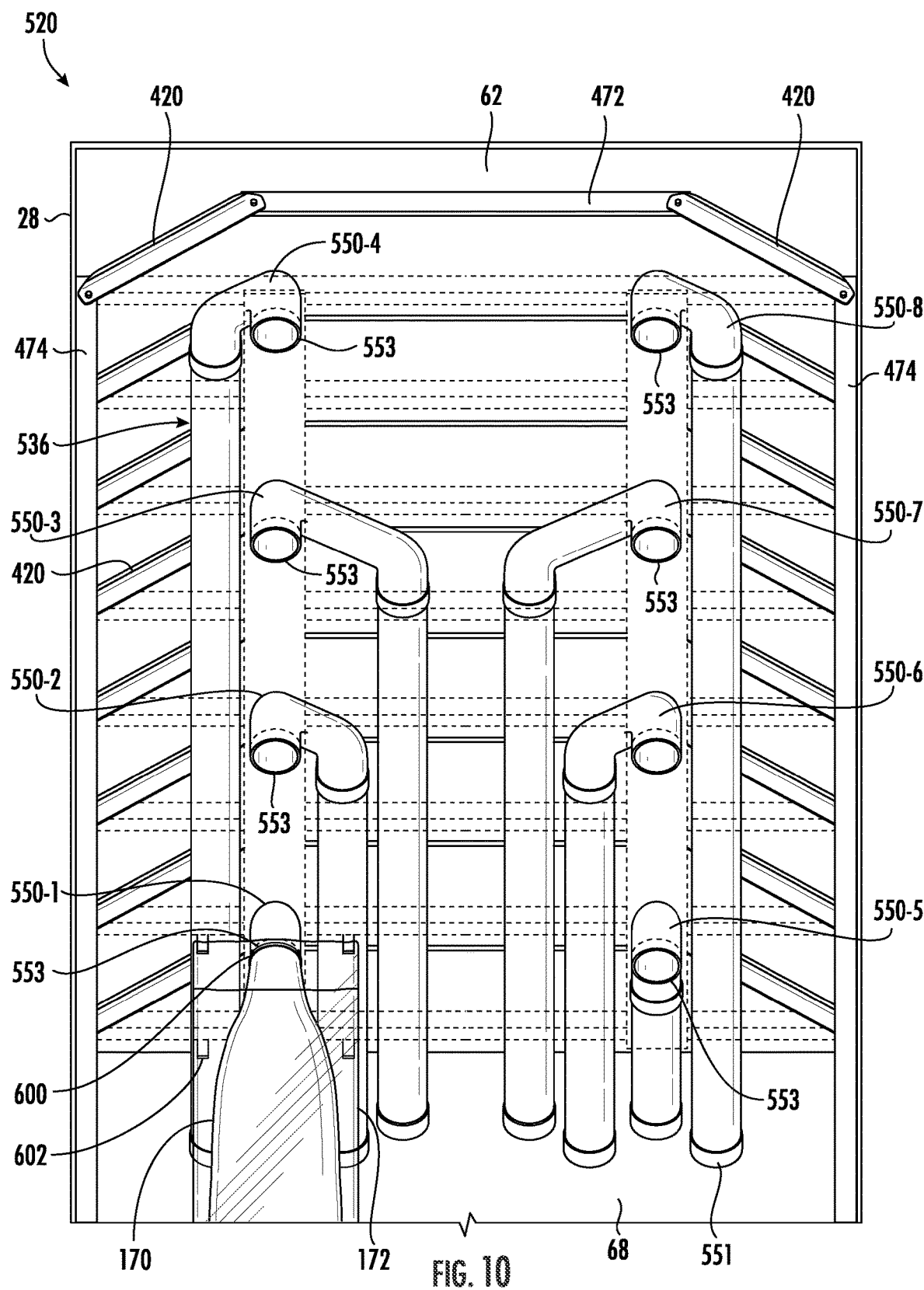
Figure 11:
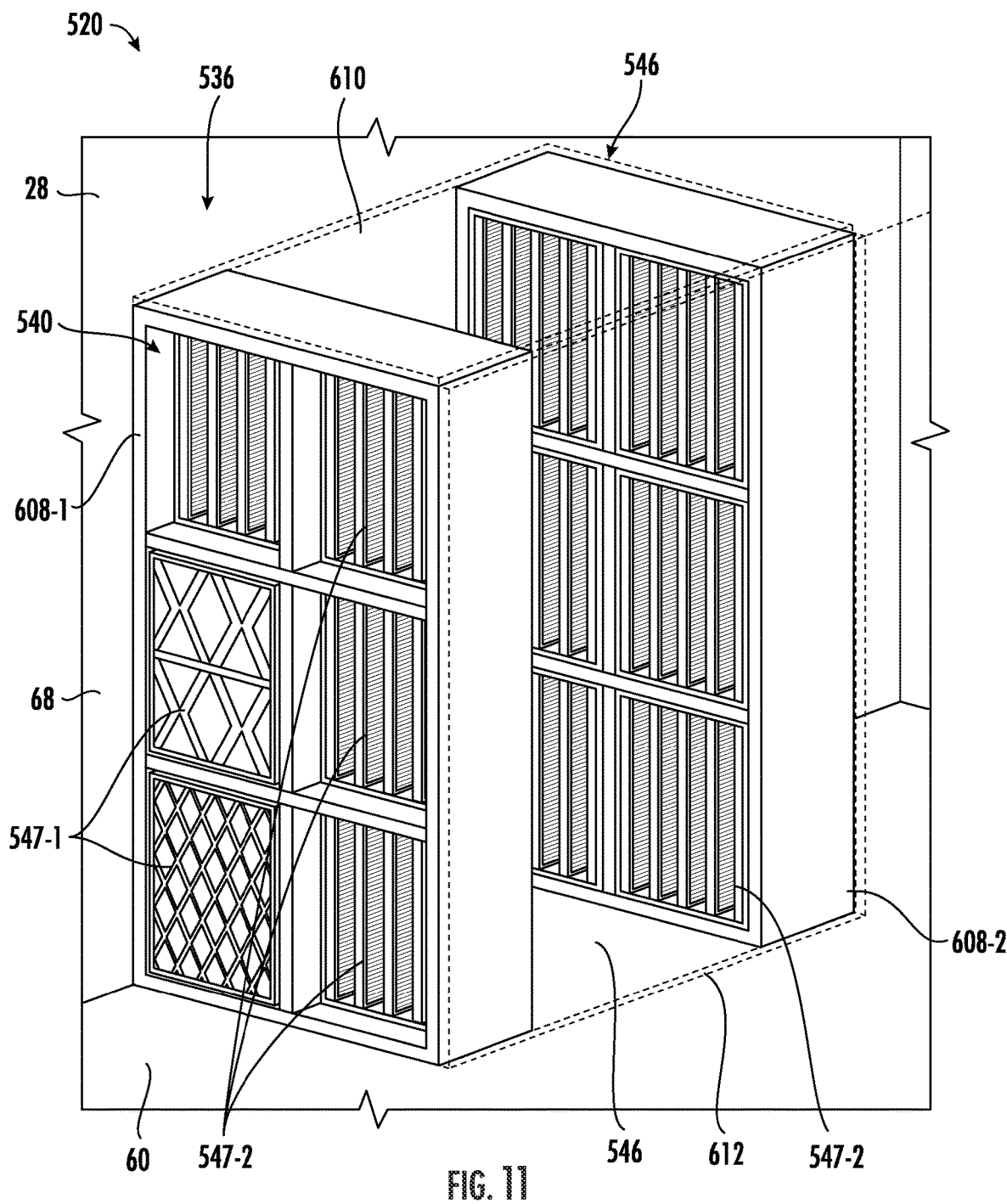
Figure 12:
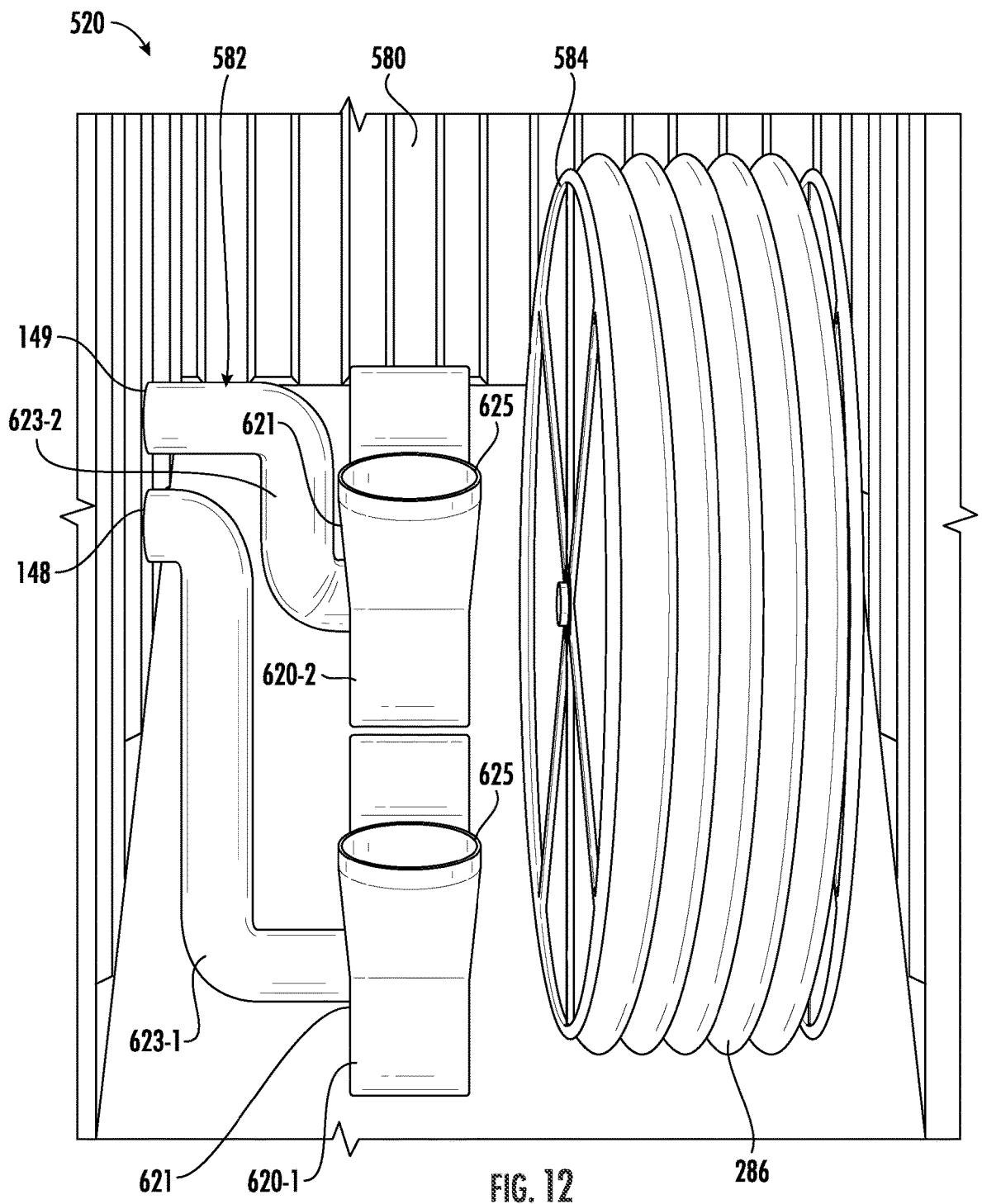

FIGS. 10-12 illustrate vacuum collection vehicle 520. Vacuum collection vehicle 520 similar to vehicle collection vehicle 320 described above except that vacuum collection vehicle 520 comprises the particular example implementations of various components of vehicle 320. FIG. 10 illustrates an example implementation of a pneumatic discharge system and an example implementation of inner and outer collection receptacle support. FIG. 11 illustrates an example implementation of a filter unit within back in container 28. FIG. 12 illustrates an example implementation of a storage container and vacuum source. Remaining components or features of vacuum collection vehicle 520 are shown and described above with respect to FIGS. 4-9.

As shown by 10, vacuum collection vehicle 520 comprises pneumatic discharge system 536 in place of pneumatic discharge system 136. Like pneumatic discharge system 136, mag discharge system 536 delivers collected material to various space locations within vacuum container 28. Pneumatic discharge system 536 comprises discharge conduits 550-1, 550-2, 550-3, 550-4, 550-5, 550-6, 550-7 and 550-8 (collectively referred to as discharge conduits 550). Each of such conduits 550 extends from a corresponding inlet 551 that extends through wall 68, above filter unit 532 shown in FIG. 11, to the interior of storage container 280 for connection-to-connection hose 286. The vacuum formed within vacuum container 28 draws collected material from the inlet of the collection of 286, through the collection hose 286 and through the connected discharge conduits 550. The collected material drawn through the particular discharge conduit 550 is discharged through the corresponding downspout 553 of the particular discharge conduit 550.

In the example illustrated, discharge conduits 550 have varying lengths and are transversely spaced along a width of front wall 68 such that the downspout 553 discharge collected material at different space locations within vacuum container 28. In the example illustrated, discharge conduits 550 discharge collected material in two rows of locations along the interior vacuum container 28, where each row comprises four longitudinally spaced locations. In the example illustrated, each of discharge conduits 550 comprises a polyvinyl chloride (PVC) pipe having a diameter of at least 5 inches and nominally 6 inches. In other implementations, vehicle 520 may have a greater or fewer number of such discharge conduits 550. In other implementations, the discharge conduit 550 may have differing sizes and may have different discharge locations.

As further shown by FIG. 10, vacuum collection vehicle 520 comprises inner collection receptacle support 600 and outer collection receptacle supports 602. Inner collection receptacle support 600 comprises a ring or hose clamp that secures the mouth of inner collection receptacle 170 about the associated downspout 553. Outer collection receptacle support 602 may comprise a spring clamp having a spring biased jaw that clamps to opposite sides of the sheet forming the mouth of outer collection receptacle 172 (transparently shown). In other implementations, supports 600, 602 may comprise other forms of clamps, hooks, or the like.

As shown by FIG. 11, vacuum collection vehicle 520 comprises filter unit 532 in place of filter unit 132. Filter unit 532 comprises filter 540 and filter housing 546. Filter housing 546 comprises a pair of compartmentalized cabinets or racks 608-1, 608-2 (collectively referred to as racks 608) which of abut rear wall 68 of backing container 28 in which further abut floor 60 of vacuum container 28. Racks 608 are spaced apart one another and extend from front wall 68 in a longitudinal direction towards the rear of vacuum compartment 28. Filter unit 546 further comprises a top imperforate panel 610 and a rear imperforate panel 612 (both of which are transparently shown) which enclose and seal the post-filter interior 546 form between racks 608. Post-filter interior 546 is connected to vacuum ports 148, 151 (shown in FIG. 7) which extends through front wall 68 to vacuum source 582 (shown in FIG. 12).

Each of racks 608 comprises a grid-like arrangement of six compartments, wherein each of such compartments contains a portion of filter 540. Because racks 608 include multiple compartments, a large filtering area may be provided through the use of multiple smaller individual filters, reducing cost. The individual smaller filters may be individually replaced as needed, further reducing cost. Because the racks 608 extend rearwardly from front wall 68, longer racks having more than six compartments and providing an even larger filtering surface area may be provided in other implementations without requiring substantial modifications to vacuum container 28.

In the example illustrated, filter 540 comprises multiple 4" by 24"×24" MERV rated pre-filters 547-1 arranged and from multiple 12"×24"×24" high-capacity HEPA filters 547-2 arranged in a grid. For ease of illustration, some of the prefilters 547-1 supported by racks 608-1 are omitted to illustrate the HEPA filters 547-2 which are supported behind the MERV rated prefilters 547-1. In some implementations, the MERV rated prefilters 547-1 comprise a prefilter having a MERV rating of between 8 and 13 and formed from a material such as polyester or cotton fabric. In other implementations, filter unit 526 may employ other filters and prefilters.

As shown by FIG. 12, vacuum collection vehicle 520 comprises vacuum source 582 and hose reel 584 within storage container 280. Vacuum source 582 comprises a pair of vacuum units 620-1, 620-2 that each include a rotatably driven impellers. Vacuum unit 620-1 has an inlet 621 connected to vacuum port 148 by conduit 623-1. Vacuum unit 620-2 has an inlet 621 connected to vacuum port 151 by conduit 623-02. Conduits 623-1 and 623-2 have shaped such that vacuum port 151 is vertically above port 148, facilitating closer transverse positioning of racks 608. In the example illustrated, each of vacuum sources 620 has a discharge port 625 that discharges air to the interior of storage container 280. As described above, in some implementations, each of such discharge port 65 may be connected by a conduit to a floor port for reducing noise within storage container 280. In some implementations, vacuum source 582 may comprise a single vacuum unit.

Hose reel 584 comprise a reel rotatably mounted to a front wall of storage container 280. Hose reel 584 stores collection hose 286 when collection hose 286 is not being used. In some implementations, the hose reel 286 is mounted within storage container 280 prior to the placement of vacuum container on the chassis adjacent the storage container 280.

Although the present disclosure has been described with reference to example implementations, workers skilled in the art will recognize that changes may be made in form and detail without departing from the disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A vacuum collection vehicle comprising:
   a chassis;
   a vacuum container supported by the chassis, the vacuum container comprising a floor, a roof, and side walls;
   a vacuum source supported by the chassis and separated from the vacuum container by an intermediate wall;
   a filter;
   the vacuum source in pneumatic connection with the filter through the intermediate wall to draw air from an interior of the vacuum container through the filter and to discharge the air following the filtering;
   a plurality of discharge conduits extending through the intermediate wall, the plurality of discharge conduits comprising a first discharge conduit and a second discharge conduit, the plurality of discharge conduits extending over and above the filter, along the roof of the vacuum container, the plurality of discharge conduits having a plurality of respective outlets at different locations within the interior of the vacuum container for discharging collected material into different collection receptacles, wherein the filter is located between the intermediate wall and a plurality of outlets of the plurality of discharge conduits.

2. The vacuum collection vehicle of claim 1 further comprising a storage container having floor and a roof, wherein the storage container is separated from the vacuum container by the intermediate wall, wherein the plurality of discharge conduits have inlet ports within the storage container, between the floor and the roof of the storage container.

3. The vacuum collection vehicle of claim 1, wherein the vacuum source has a discharge port to discharge air through a floor of the chassis.

4. The vacuum collection vehicle of claim 1, wherein the intermediate wall separates a storage container supported by the chassis and containing a hose reel to store a collection hose for connection to the first discharge conduit.

5. The vacuum collection vehicle of claim 1 further comprising:
   an inlet port for connection to a collection hose; and
   a valve to selectively connect the inlet port to one of the first discharge conduit and the second discharge conduit.

6. The vacuum collection vehicle of claim 1 further comprising:
   a sensor within the vacuum container to output signals indicating an amount of collected material at a first location in the vacuum container corresponding to the first discharge conduit; and
   a controller to automatically actuate the valve to connect the inlet port to the second discharge conduit based upon the signals from the sensor.

7. The vacuum collection vehicle of claim 1 further comprising:
   a first inner collection receptacle support within the vacuum container and mountable to a first air transmissive flexible and collapsible inner collection receptacle to hang the first air transmissive flexible and collapsible inner collection receptacle from the roof in an upright orientation below the outlet of the first discharge conduit;
   a first flexible collection receptacle support within the vacuum container and mountable to a first non-air transmissive flexible and collapsible outer collection receptacle to hang the first non-air transmissive flexible and collapsible outer collection receptacle from the roof about and spaced from the air transmissive flexible and collapsible inner collection receptacle;
   a second inner collection receptacle support within the vacuum container and mountable to a second air transmissive flexible inner collection receptacle to hang the second air transmissive flexible and collapsible inner collection receptacle from the roof in an upright orientation below the outlet of the second discharge conduit; and
   a second flexible collection receptacle support within the vacuum container and mountable to a second non-air transmissive flexible and collapsible outer collection receptacle to hang the second non-air transmissive flexible outer collection receptacle from the roof about and spaced from the second air transmissive flexible and collapsible inner collection receptacle.

8. The vacuum collection vehicle of claim 7 further comprising:
   a first perforate bag hanging from the roof and forming the first air transmissive flexible and collapsible inner collection receptacle;
   a first imperforate bag hanging from the roof and forming the first non-air transmissive flexible and collapsible outer collection receptacle;
   a second perforate bag hanging from the roof and forming the second air transmissive flexible and collapsible inner collection receptacle; and
   a second imperforate bag hanging from the roof and forming the second non-air transmissive flexible outer collection receptacle.

9. The vacuum collection vehicle of claim 1 further comprising:
   a second filter; and
   a filter housing supporting the filter and the second filter and forming a post filter interior sandwiched between the filter and the second filter, wherein the filter and the second filter face away from the post filter interior towards the side walls of the vacuum container and wherein the vacuum source is pneumatically connected to the post filter interior between the filter and the second filter.

10. The vacuum collection vehicle of claim 1, wherein the vacuum container comprises an exterior door and wherein the vacuum collection vehicle further comprises:
    a first flexible flap and a second flexible flap overlapping the first flexible flap, the first flexible flap and the second flexible flap forming an isolation wall between the exterior door and the outlet of the first discharge conduit.

11. The vacuum collection vehicle of claim 1, wherein the vacuum container further comprises an exterior door, the vacuum collection vehicle further comprising:

reinforcement posts projecting from the floor within the vacuum container adjacent the exterior door, wherein the reinforcement posts are removable or retractable.

12. The vacuum collection vehicle of claim 1, wherein the vacuum container further comprises braces angularly extending between the roof and the side walls.

13. The vacuum collection vehicle of claim 1 further comprising a sensor supported by the vacuum container to output signals indicating an amount of the collected material at the first location within the vacuum container.

14. The vacuum collection vehicle of claim 1, wherein the vacuum container has an interior volume of at least 500 cubic feet.

15. The vacuum collection vehicle of claim 1 further comprising:
   wheels supporting the chassis; and
   an internal combustion engine or motor operably coupled to the wheels to drive the wheels.

16. The vacuum collection vehicle of claim 1, wherein the first discharge conduit and the second discharge conduit extend parallel to one another from a front of the vacuum container towards a rear of the vacuum container.

17. The vacuum collection vehicle of claim 1, wherein the filter vertically extends upward from the floor.

18. The vacuum collection vehicle of claim 1, wherein the filter is supported independent of opposing side walls of the vacuum container.

19. A vacuum collection vehicle comprising:
   a chassis;
   a vacuum container supported by the chassis, the vacuum container comprising interior walls including a floor, a roof, and side walls;
   a filter unit within the vacuum container, the filter unit comprising:
      a filter; and
      a filter housing supporting the filter and forming a post filter interior, the post filter interior being adjacent a first side of the filter and having a port for connection to a vacuum source; and
   a pneumatic discharge system comprising:
      a first discharge conduit having a first inlet for receiving pressurized gas carrying collected material and a first outlet to discharge the collected material at a first location in the vacuum container;
      a second discharge conduit having a second inlet for receiving pressurized gas carrying collected material and a second outlet to discharge the collected material at a second location in the vacuum container; and
   a second filter unit within the vacuum container, the second filter unit comprising:
      a second filter; and
      a second filter housing supporting the second filter and forming a second post filter interior adjacent a first side of the second filter, the second filter housing being supported within the vacuum container, wherein the filter and the second filter face the side walls of the vacuum container.

20. A vacuum collection vehicle comprising:
   a chassis;
   a vacuum container supported by the chassis, the vacuum container comprising interior walls including a floor, a roof, side walls and an exterior door;
   a filter unit within the vacuum container, the filter unit comprising:
      a filter; and
      a filter housing supporting the filter and forming a post filter interior, the post filter interior being adjacent a first side of the filter and having a port for connection to a vacuum source;
   a pneumatic discharge system comprising:
      a first discharge conduit having a first inlet for receiving pressurized gas carrying collected material and a first outlet to discharge the collected material at a first location in the vacuum container;
      a second discharge conduit having a second inlet for receiving pressurized gas carrying collected material and a second outlet to discharge the collected material at a second location in the vacuum container, and
   a first flexible flap and a second flexible flap overlapping the first flexible flap, the first flexible flap and the second flexible flap forming an isolation wall between the exterior door and the outlet of the first discharge conduit.

\* \* \* \* \*